United States Patent [19]

Lukas

[11] 4,413,763
[45] Nov. 8, 1983

[54] METHOD AND APPARATUS FOR BREAKING AN OPTICAL FIBER

[75] Inventor: Helmut H. Lukas, Carleton Place, Canada

[73] Assignee: Northern Telecom Limited, Montreal, Canada

[21] Appl. No.: 282,819

[22] Filed: Jul. 13, 1981

[51] Int. Cl.³ ............................................. C03B 37/16
[52] U.S. Cl. .......................................... 225/2; 225/96; 225/96.5; 225/101
[58] Field of Search .................. 225/96.5, 2, 96, 101; 65/2, 102

[56] References Cited

U.S. PATENT DOCUMENTS

| 3,934,773 | 1/1976 | Chinnock et al. | 225/96.5 X |
| 4,017,013 | 4/1977 | Hawk et al. | 225/96.5 |
| 4,036,419 | 7/1977 | Hensel et al. | 225/96.5 |
| 4,154,385 | 5/1979 | Lewis | 225/2 X |
| 4,159,793 | 7/1979 | Belmonte et al. | 225/96.5 |
| 4,229,876 | 10/1980 | Doty | 225/96.5 |
| 4,315,584 | 2/1982 | Wuestner | 225/96.5 X |

Primary Examiner—Frank T. Yost
Attorney, Agent, or Firm—S. T. Jelly

[57] ABSTRACT

In a method of breaking an optical fiber, wherein the fiber is scored transversely and tensioned to cause a crack to propagate completely across the fiber, tension sufficient to cause the crack to propagate is applied after, but not during, the scoring step. During the scoring step the fiber is subjected to a controlled tension insufficient to sever the scored fiber. The resulting broken fiber ends generally are flat and perpendicular, and thus suitable for making low-loss interconnections. Preferred apparatus for breaking the fiber has a common actuator providing sequential control of individual means for locating, scoring and tensioning the fiber. The common actuator may be rotational, facilitating powered operation by a drive motor, and may be adjustable axially to enable accurate adjustment of the position at which the fiber is scored. In one, preferred, embodiment suitable for breaking a fiber at a predetermined distance from a connector already attached to it, the connector skirt screws onto a bush. The projecting end extends through the bush and is gripped by a gripping jaw carried by a member spaced from the bush and movable away there from to sever the fiber.

27 Claims, 13 Drawing Figures

METHOD AND APPARATUS FOR BREAKING AN OPTICAL FIBER

This invention relates to a method and apparatus for breaking an optical fiber so as to provide a flat, perpendicular end surface suitable for low-loss connection to another such fiber, a connector or other device.

In known methods and apparatus of this kind the optical fiber is first tensioned, usually bent around a controlled radius on an anvil, then scored at the desired break point. The level of tension applied is such that the scoring of the fiber initiates a crack which propagates completely across the fiber. It has been found that such known apparatus does not produce, consistently, the required flat, perpendicular ends. This can lead to considerable waste of time and material, especially when, as often happens, the fiber is being broken at a predetermined distance from a connector previously and permanently attached to it. If the broken end is unsatisfactory, the connector usually has to be scrapped.

In other known apparatus the fiber is gripped, without tensioning, at two spaced positions and scored at an intermediate position. The grippers are then released and the fiber severed by pulling in opposite directions the parts either side of the score.

According to one aspect of the present invention, in a method of breaking an optical fiber, wherein the fiber is scored transversely and tensioned to cause the score so produced to initiate a crack which propagates completely across and severs the fiber, the improvement consists in that tension sufficient to cause the crack to propagate across the fiber is applied after, but not during, the scoring step; and during the scoring step the fiber is subjected to a controlled tension insufficient to sever the scored fiber.

With such a method, any torque imparted to the fiber by the scoring tool should have subsided before the crack starts to propagate. Consequently there is less tendency for the crack to deviate from a plane perpendicular to the length of the fiber. Also, the small tension applied to the fiber during scoring, which preferably is adjustable, provides for controlled scoring with consequently consistent quality of the broken ends of the fiber.

According to a second aspect of the invention, apparatus for breaking an optical fiber by the method of the first aspect, comprises means for scoring the fiber transversely to its length to produce a score and means for tensioning the fiber to initiate a crack to propagate from the nick completely across and sever the fiber, wherein the tensioning means is arranged to apply to the fiber after, but not during, the scoring step, a tension sufficient to cause the crack to propagate completely across the fiber, and during scoring, to a controlled tension insufficient to sever the fiber on scoring.

In one preferred embodiment, the apparatus comprises two spaced members each having means for releasably locating against axial movement relative to that member a portion of optical fiber extending therebetween, the members being relatively movable to vary the spacing between the locating means in the direction of the longitudinal axis of the fiber; scoring means operative to score the fiber at a position between the locating means; and means for controlling tensioning and scoring of the fiber between the locating means such that during scoring the tension is insufficient to sever the fiber on scoring but after scoring the tension is increased to a level sufficient to sever the scored fiber.

Preferably the locating means are biased apart in the direction of the longitudinal axis of the fiber by spring means, for example a compression spring acting between the spaced members. The means for controlling application of tension may then comprise an abutment to restrict relative separational movement of the locating means, by the spring means, during operation of the locating means to locate the fiber, the abutment being displaceable subsequently to allow the spring means to bias the locating means apart, thus tensioning the fiber located therebetween. The controlling means may comprise a second abutment operative after the fiber has been scored to bias the locating means further apart to sever the scored fiber.

In preferred embodiments, operation of the locating means, the scoring means and the means controlling tension, is controlled sequentially by common actuating means. Advantageously the actuating means operates rotationally, facilitating either manual operation by a simple handwheel or crank, or powered operation, say by a drive motor.

Such a rotary actuating means may conveniently comprise a member rotatable about an axis extending substantially parallel to the direction of movement of the locating means, but spaced laterally therefrom. The scoring means may then extend radially from the actuator member to rotate therewith to score the fiber between the locating means.

Preferably the rotary actuating means is adjustable axially relative to the locating means to allow accurate positioning of the break point. The actuating member may also carry cams to serve as the abutments controlling relative movement of the spaced members.

Conveniently, the spaced members may be of elongate form and pivotally interconnected, the locating means being provided at or adjacent the ends of the members remote from the pivot. The required separational movement of the locating means may then be obtained by pivoting one elongate member relative to the other.

In one particular compact arrangement, one of the spaced members is fixed, comprising one limb of a generally U-shaped support member, the two limbs of which support the actuating means. The other spaced member is pivotally connected to the bight portion of the U-shaped member and has a central aperture to accommodate the actuating means.

The fiber-locating means may each comprise gripping means operative to grip the fiber as it extends past the associated one of the spaced members. Alternatively one of the locating means may comprise an abutment for a part fixed axially relative to the fiber. The abutment may comprise a part of, or secured to, the associated one of the spaced members, and be configured to cooperate with, preferably conform to, a part of a coaxial connector already fixed to the fiber so as to leave a projecting end portion. Where such a connector has an internally screw-threaded attachment skirt, the abutment may be a part of an internally screw-threaded boss around a hole through which the projecting fiber end portion will extend when the connector skirt is fastened to the boss.

The or each gripping means may comprise a jaw member pivotally connected at one end to the associated one of the spaced members and spring-biased towards such member so as to clamp the fiber against the underlying surface of the member, which may have a transverse notch to locate the fiber laterally when clamped.

Embodiments of the invention will now be described, by way of example only and with reference to the accompanying drawings, in which.

Figure 2:
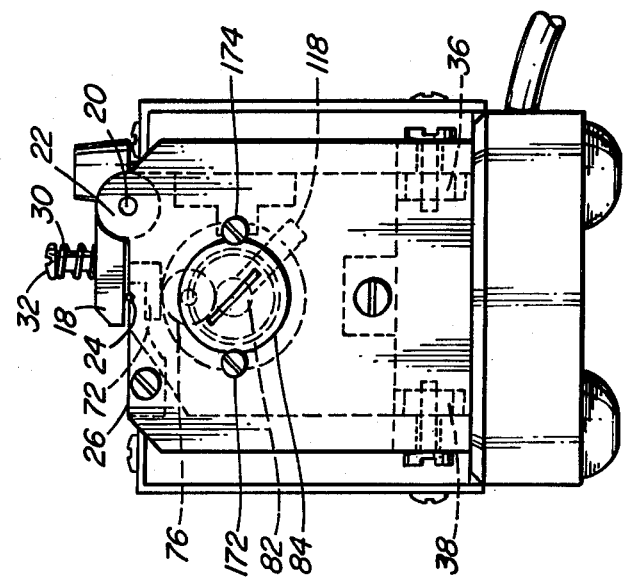
FIG. 2 is an end view of the apparatus.

Referring to FIGS. 1 to 4, apparatus for breaking an optical fiber comprises a base member 10 upon which is mounted a channel-shaped support member 12 with its limbs 14 and 16, respectively, projecting upwards. At its distal end, the limb 14 is provided with gripping means for locating the optical fiber relative to the limb 14. The gripping means comprises a jaw member 18 pivotally coupled at one end by a pin 20 to a boss 22 at one side of the end of limb 14. The jaw member 18 extends beyond and above a transverse notch 24 provided centrally in the underlying end surface 26 of limb 14. The jaw 18 is biased towards the notch 24, to clamp a fiber 28 therein, by means of a spring 30 acting between the jaw 18 and the head of a screw 32 which passes through the spring 30 and jaw 18 into the limb 14.

A second fiber gripping means is provided at the upper end of a member 34 which extends generally parallel to limb 14. The member 34 is pivotally connected at its lower end to the support member 12 by laterally spaced lugs 36 and 38, which depend from the bottom of the movable member 34 and into slots 40 and 42, respectively, in the bight portion of the channel member 12. The lugs 36 and 38 are pivotally secured in the slots 40 and 42 by pivot pins 44 and 46 which extend through transverse holes 48 and 50 in the lugs 36 and 38, respectively. The pivot pins 44 and 46 comprise reduced diameter end portions of screws 52 and 54 which extend into the bight portion of the support member 12 through screw-threaded holes 56 and 58, respectively, in opposite sides of the support member 12.

The second gripping means is similar to that on limb 14 and comprises a gripper jaw 60 secured at one end by a pivot pin 62 to a boss 64 at one side of the member 34. A spring 66, acting between the jaw 60 and the head of a screw 68, biases the jaw 60 towards a notch 70 in the underlying end surface of the member 34. The notch 70 is aligned with notch 24 in the limb 14.

The gripper jaws 18 and 60 have L-shaped cam followers 72 and 74 respectively, which project below the jaws to cooperate with cams 76 and 78, respectively, carried by a rotary actuator 80. The actuator 80 comprises a main shaft 82 and coaxial sleeve 84 secured thereto by a screw 86. The shaft 82 is supported at one end in a bearing 88 in the limb 14, extends through an aperture 90 in the movable member 34, and is supported in a second bearing 92 in the limb 16 of the support member. The sleeve 84 is positioned with its opposite end faces aligned with the gripper jaws 18 and 60. The cams 76 and 78 each comprise a bearing, one mounted on each opposite annular end face of the sleeve 84. The bearings are mounted for rotation about an axis parallel to that of the main shaft 82 but spaced radially therefrom so that the bearings protrude beyond the cylindrical surface of the sleeve 84 to engage the cam followers 72 and 74. As can be seen from FIGS. 2 and 3, when the axes of the bearing cams 76 and 78 are at the top dead center position they act against the cam followers 72 and 74, respectively, to lift the gripper jaws 18 and 60 against the action of their respective springs and away from the notches 24 and 70 to permit insertion of the optical fiber. Rotation of the actuator shaft in the direction of arrow B in FIG. 3 disengages the bearings 76 and 78 from the cam followers 72 and 74 allowing the gripping jaws to clamp the fiber 28 into the notches to extend across an anvil plate 94, which extends with its upper surface between, and immediately subjacent, the notches 24 and 70. The anvil plate 94 is secured to the fixed limb 14 by screws 95 and 97 which extend through clearance holes in the limb 14 into screw-threaded holes in the anvil plate.

The upstanding limbs 14 and 34, and hence the gripping means associated therewith, are biased apart by a compression spring 96, one end of which is seated in a recess 98 in the side of member 34. The other end of the spring 96 extends into a screw-threaded hole 100 in the limb 14 and acts against the opposed end of a screw 102 in that hole.

A pin 106 projects inwardly from one side of the aperture 90 in the movable member 34 substantially radially of the actuator shaft 82. The pin 106 serves as a cam follower, cooperating with a cam shoulder 108 on a second sleeve 110 on the main shaft 82. The cam shoulder 108 comprises the annular surface of the sleeve directed towards the movable member 34. The profile of cam 108 undulates axially such that, when the gripping jaws are open, i.e. the bearings 76 and 78 are at top dead center, the member 34 is urged by the cam 108, against the action of the spring 96, towards the fixed member 14. As the cam shaft 82 rotates, after the fiber has been gripped, the pin 106 is allowed to move axially away from limb 14. The member 34 is therefore biased away from limb 14 by spring 96, but restrained by the fiber portion trapped between the two gripping means 18 and 60.

The anvil plate 94 has a lateral slit 116 at a predetermined spacing from the limb 14. A diamond tipped scoring tool 118 projects radially from the cam shaft 82 and is of such a length that, as the tool tip passes through the top dead center position, it will project through the slot 116 to nick or score the optical fiber stretched across the anvil plate 94.

It should be noted that the spring 96 is adjusted so that the tension applied to the fiber at this stage is insufficient to sever the fiber when it is scored. Adjustment of the tension applied to the fiber prior to such nicking is possible by altering the compression of spring 96 by screw 102. Thus variations in diameter and/or flexibility of the fiber, and in the sharpness of the scoring tool, can be accommodated in ensuring that a satisfactory nick is made. Experiments have shown that for a Northern Telecom fiber with a diameter of 0.005 inches, and using a diamond scoring tool, consistently good results were obtained when a pretension of approximately 10–15 gms was applied to the fiber during scoring. It was also found that increasing the pretensioning force to 30–50 gms caused a deterioration in the quality of the broken ends, particularly due to hackle.

After scoring, the fiber is severed by further separating the two gripping means. This separation is effected by urging the movable member 34 away from the fixed limb 14 by means of a further cam 120. The further cam 120 comprises a bearing mounted for rotation about a pin 122 extending radially from the cam shaft 82. The bearing cam 120 cooperates with an abutment 124, supported by an arm 126 (see FIG. 4) which projects axially from the side of movable member 34 facing away from the fixed limb 14. As can be seen from FIGS. 3 and 4, after the fiber has been scored further rotation of the shaft 82 rotates the bearing cam 120 past the abutment 124, urging it in the direction of arrow A (FIG. 1) and thus causing the movable member 34 to pivot sharply away from fixed limb 14, separating the two gripping means. This causes a crack to propagate from the nick or score, completely across the fiber, producing severed fiber ends which are substantially flat and perpendicular to the longitudinal axis of the fiber.

Still further rotation of the shaft 82 brings the cam shoulder 108 to bear against pin 106 to restore the member 34 to its initial, upright, position. Yet more rotation brings the cams 76 and 78 to the top dead center position again, opening the gripping jaws just before that position to permit removal of the broken fiber parts and insertion of a new fiber.

Figure 5:
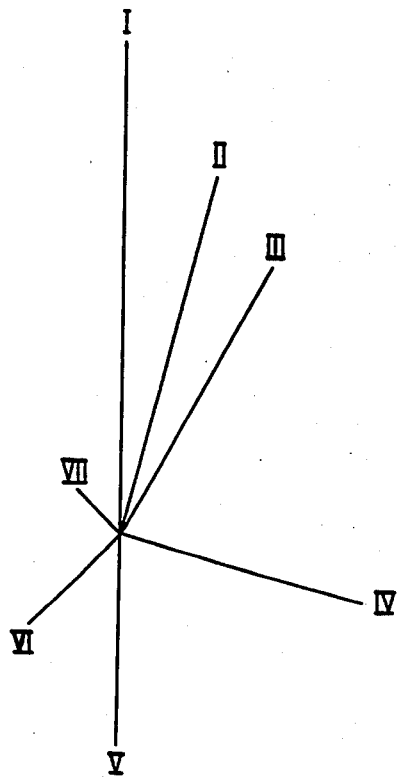
FIG. 5 is a schematic diagram depicting the operating sequence for the apparatus.

The sequence of operation of the various parts of the apparatus is determined by the relative angular positions of the various cams and scoring tool. In the illustrated embodiments, these positions are such that the entire sequence is completed in one revolution of the shaft 82. The sequence is illustrated in FIG. 5, in which radial lines I through VII indicate the positions of the radius through the cams 76 and 78. The steps in the sequence as the shaft 82 rotates are as follows:

I. The gripper jaws are held open by the cams 76 and 78 allowing the fiber 28 to be inserted; cam shoulder 108/pin 106 hold movable member 34 vertical against the action of spring 96.
II. The gripper jaws close to hold the fiber across the anvil plate 94.
III. The cam shoulder 108 disengages the pin 106, releasing the member 34 which pivots away from the fixed limb 14 until restrained by the fiber 28, which is thus tensioned by the spring 96.
IV. The diamond tool 118 scores the fiber through the slot 116.
V. Cam 120 acts against abutment 124 to urge the movable member 34 away from limb 14, further separating the gripping means and thus severing the fiber.
VI. Cam shoulder 108 acts against pin 106, starting to return the member 34 to its initial position.
VII. The gripper jaws start to open.
I. The gripper jaws are fully open again, allowing removal of the broken fiber and insertion of a new one.

The sequence then repeats.

Figures 6A, 6B:
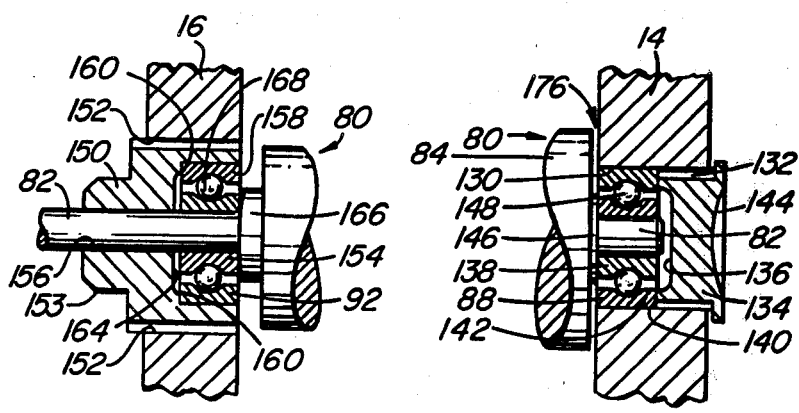
FIGS. 6a and 6b are sectional detail views showing bearing assemblies for a rotary actuator part of the apparatus.

FIGS. 6(a) and 6(b) show in more detail the bearings 92 and 88 which support the main shaft 82 of the rotary actuator 80.

Referring first to FIG. 6(b), bearing 88 is accommodated in a hole 130 through the fixed limb 14. The width of the bearing is about one half the thickness of limb 14 and the bearing 88 is a sliding fit in that half of hole 130 which is nearest to the middle of the apparatus. The remainder of hole 130 is internally screw-threaded, as indicated at 132, and houses a cylindrical plug 134, which itself is externally screw-threaded to engage the hole 130. The inner end face of the plug 134 has a central recess 136 of larger diameter than the inner race 138 of the bearing 88. When the annular end face 140, around the recess 136, bears against the outer race 142 of the bearing 88, the recess 136 provides end clearance for both the inner race 138 and the end of the main shaft 82, which extends through the inner race 138. The outer end face of the cylindrical plug 134 has a screw driver slot 144 whereby the plug 134 may be screwed into or out of hole 130 in adjusting the axial position of the bearing 88.

As mentioned previously, the actuator 80 comprises a cylindrical sleeve 84 secured to the shaft 82. As shown in FIG. 6(b), the end face of the sleeve 84 is stepped to provide a short portion 146 which has a diameter less than the internal diameter of the outer race 142 of the bearing 88. Consequently, when the end face of sleeve portion 146 abuts the inner race 138, the surrounding end wall of the sleeve 84 is spaced from the outer race 142. Thus, when plug 134 is screwed into the fixed limb 14, the inner and outer races will be urged axially in opposite directions, but restrained by the balls 148 acting between opposed curved race surfaces of the inner and outer races. Consequently any play between the balls 148 and inner and outer races of the bearing 88 is taken up before the actuator 80 is moved axially.

The bearing 92 in the other support limb 16, shown in FIG. 6(a), is similarly arranged to eliminate play. The bearing 92 is housed in a cup-shaped member 150, which is externally screw-threaded to engage a correspondingly screw-threaded hole 152 through the support limb 16. The closed end of the cup-shaped member 150 protrudes from the hole 152 and has a hexagonal head part 153 whereby the member 150 can be rotated.

The main shaft 82 of the rotary actuator 80 extends through the inner race 154 of the bearing 92 and through a coaxial bore 156 in the closed end of the cup-shaped member 150. The outer race 158 of bearing 92 seats against an annular seating 160 comprising part of the internal end wall of the cup-shaped member 150. The end wall has a central circular recess 164, larger in diameter than the inner race 154, to provide clearance between the cup-shaped member 150 and the inner race 154.

The end of sleeve 110 adjacent bearing 92 is stepped to provide a short portion 166, of lesser diameter than the outer race 158 of bearing 92, which will bear against the inner race 154. When the cup-shaped member 150 is screwed into the support limb 16, to move the bearing 92 towards the end of sleeve 110, any play between the outer race 158, inner race 154 and balls 168 of the bearing 92 will be eliminated.

In preparing the apparatus for use, the cylindrical plug 134 and cup-member 150 are screwed towards each other until any axial play in the bearings 88 and 92 has been substantially eliminated, care being taken not to overtighten the bearings and load them axially to such an extent as to induce excessive wear and friction.

The cylindrical plug 134 and cup-member 150 can then be locked in the desired position. The plug 134 is locked by screws 172 and 174 (see FIG. 2) which engage in screw-threaded holes in the fixed limb 14 at the circumference of the plug 134 such that, when tightened, their heads will clamp the plug 134 at its edge and prevent its rotation. Similar locking screws (not shown) are provided in the support limb 16 to lock the cup-shaped member 150 to the limb 16.

Should it be required to adjust the axial position of the scoring tool 118, the four locking screws are released. The plug 134 and cup-shaped member 150 are then rotated, both in the same direction and by the same amount so that the play-free condition is maintained, moving the actuator 80 axially until the scoring tool is in the desired position. This can be checked using a travelling microscope or by inserting feeler gauges into the gap 176 between the end of actuator sleeve 84 and the adjacent sidewall of limb 14. The four locking screws are then retightened.

It should be noted that elimination of play in the bearings allows the position of the scoring tool to be set, and maintained, accurately. This is particularly important when the optical fiber to be broken has already been attached to a connector, since the position of the break from the connector must usually be determined to within 0.001". Of course, such accuracy also requires that the fiber/connector be located accurately relative to the fixed limb 14.

Figure 8:
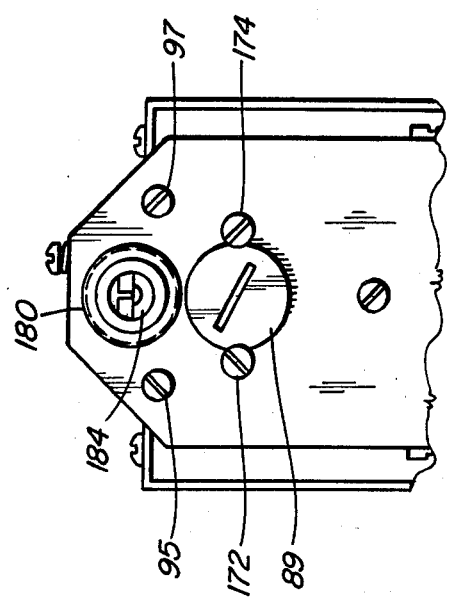
FIG. 8 is a detail end view of the modification.
Figure 7:
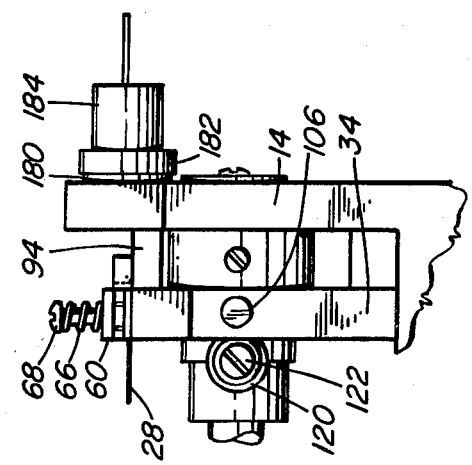
FIG. 7 is a detail side view of a modification of the apparatus.

Accurate location of the connector and fiber relative to the limb 14 is possible by the modification illustrated in FIGS. 7 and 8. This modification enables an optical fiber with a fitted connector to be broken at a precise distance from the connector.

In the modified apparatus only one gripping means is provided, being that on the movable member 34. Instead of a gripping jaw, the limb 14 is provided with an externally screw-threaded boss 180 with a central hole extending through the limb 14 and aligned with the surface of the anvil plate 94 and the notch 74. The boss 180 is configured to mate with the usual optical fiber connector 184 which is fastened to the fiber at such a position that the projecting end portion (28) is long enough to reach the gripping means 60 when the internally screw-threaded skirt 182 of the connector is secured to the boss 180 by engaging the external screw-thread of the boss 180. When the skirt 182 is tightened, a radially extending surface 184 of the boss interior abuts a corresponding radial surface of the connector interior to determine the connector's precise axial position relative to the limb 14.

The position of the scoring tool tip can then be set to score the fiber at the required spacing from the connector as previously described.

In use, the fiber projecting from the connector is inserted through the hole in the boss, to extend across the anvil plate and in the notch of the movable frame and the connector skirt is screwed onto the boss until the shoulders abut. The operation of the gripping means and scoring tool by rotation of the actuator shaft then take place in the same manner as previously described in relation to the embodiments having two spaced gripping jaws.

As mentioned previously, the tension exerted upon the fiber during scoring may be adjusted to suit different thicknesses and/or flexibility of fiber and to take account of the sharpness of the tool. It will be appreciated that increasing the tension reduces the amount by which the fiber will flex away from the scoring tool during its traverse. In some cases, however, it may be desirable to provide additional or alternative means for limiting such flexing of the fiber; for example if the distance between the locating means is relatively large and/or the fiber is gripped at only one of those locations.

Figure 9:
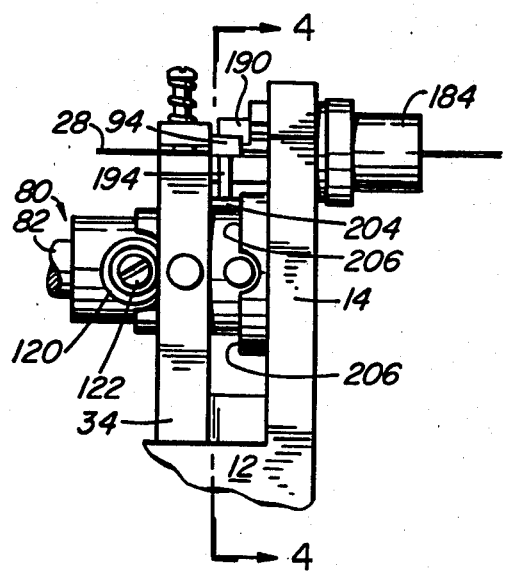
FIG. 9 is a side view of a further modification.
Figure 10:
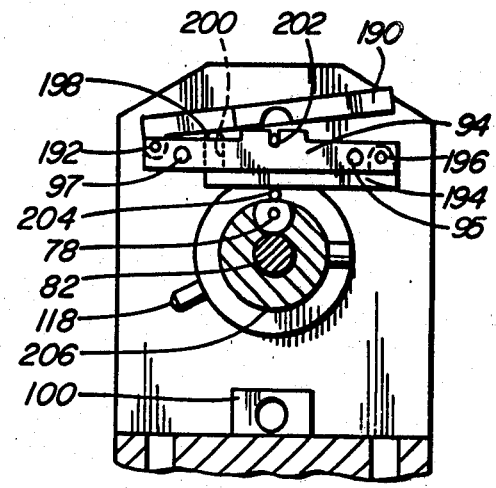
FIG. 10 is a section on the line 4—4 of FIG. 9.
Figure 11:
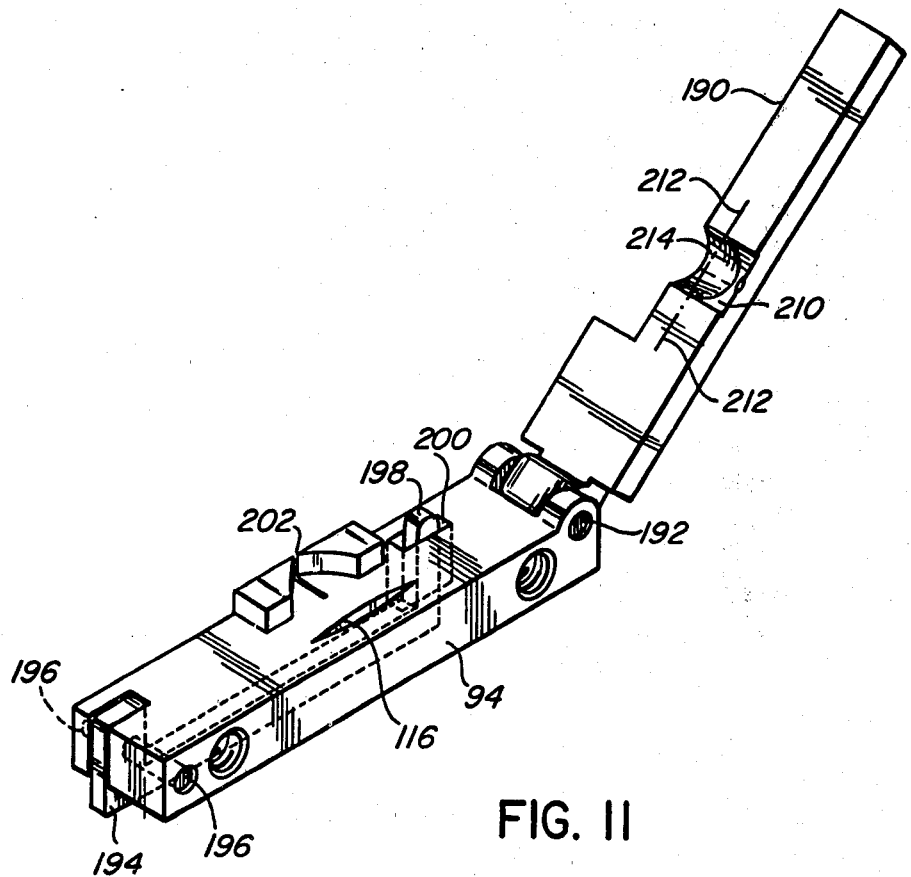
FIG. 11 is an exploded view of a part of the apparatus shown in FIGS. 9 and 10.

FIGS. 9, 10 and 11 illustrate a modification which limits deflection of the fiber away from the scoring tool. The modification is shown applied to the embodiment of FIGS. 7 and 8, since the portion of fiber between the gripping jaw 60 and the position in the connector at which the fiber is held securely, is relatively long, and hence flexible. However, the modification is equally applicable to embodiments having two gripping means.

Referring to FIGS. 9 and 10, in which parts corresponding to FIGS. 7 and 8 are identified by the same reference numerals, a fiber-retaining arm 190 is attached to the anvil plate 94 by a pivotal coupling 192 located adjacent one edge of the anvil plate 94. The arm 190 extends across the upper surface of the anvil plate 94 to a position adjacent its opposite edge. A second arm 194 is attached to the anvil plate 94 by a pivotal coupling 196 adjacent said opposite edge and extends across and beneath the anvil plate 94 in line with the retaining arm 190. The second arm 194 is shorter than the retaining arm 190 and has at its distal end a lifting lug 198 which projects upwards through an aperture 200 in the anvil plate 94. When the second arm 194 is held upwards against the underside of the anvil plate 94, as shown in FIG. 10, the lifting lug 198 lifts the retaining arm 190 away from the anvil plate enabling a fiber to be inserted to lie across the anvil plate and in the notch 202 at one side of the anvil plate. When the second arm 194 pivots downwards, the lifting lug 198 drops allowing the retaining arm 190 to pivot downwards into contact with the anvil plate 94, retaining the fiber therebetween.

Pivotal movement of the second arm 194 is controlled by a pin 204, which projects from a radially extending annular surface 206 formed by stepping the actuator sleeve 84 at a position beneath the anvil plate 94. The pin 204 is arranged to extend across and beneath the second arm 194, the arrangement being such that, as the pin 204 passes through the top dead center position, it slidingly contacts the underside of the arm 194 and causes the required upwards movement. It should be noted from FIG. 10 that the axis of pin 204 is on the same radius as the axis of cam bearing 78 so that the retaining arm 190 is lifted at the same time as the gripping jaw 60.

Preferably the fiber is not gripped between the retaining arm 190 and the anvil plate 94 but is merely closely confined in a gap between them, which typically will be 10–20% larger than the diameter of the fiber.

FIG. 11 shows the anvil plate 94 with the retaining arm 190 pivoted away from it, showing that the underside of the arm 190 is recessed at a position which will overlie the slit 116 when the arm 190 is in the closed position. The recess is to two different depths. The shallower part 210 of the recess is 10–20% deeper than the thickness of the fiber and lies to one side of the longitudinal axis 212 of the slit. The deeper part 214 of the recess is generally conical, its wider part being equal to several diameters of the fiber. This part 214 provides clearance for the broken end of the fiber portion gripped by the jaw 60 as the arm 34 returns to the initial position.

The pivots of the arm 190 and lifting lug 198 are arranged so that, in the closed position, the arm 190 lies flat upon the anvil plate 94, the fiber being confined in the gap formed between the recess 210 and the surface of the anvil plate 94 immediately adjacent the slit 116.

The weight of arm 190 thus restrains the fiber compliantly as it flexes away from the scoring tool tip as it projects through the slit to score the fiber. It should be noted that the retaining arm 190 is permitted to lift, and indeed is lifted, during scoring, so that the scoring tool may project beyond the anvil by a significant amount in relation to the diameter of the fiber.

An advantage of a rotary actuator for actuating the various parts of the apparatus is that the apparatus can be readily operated by a simple handle or drive motor.

Figure 1:
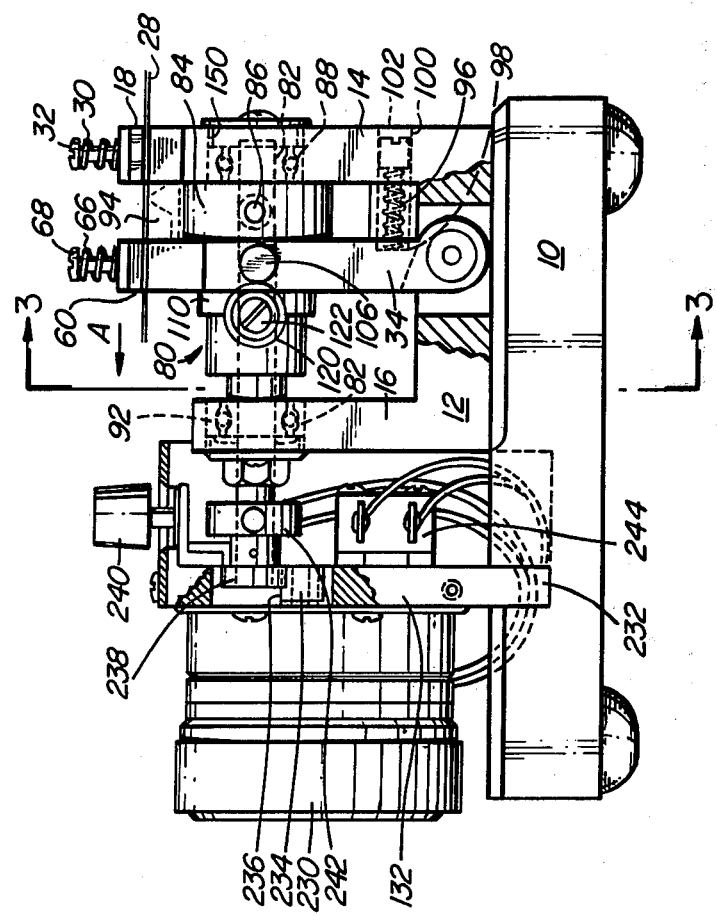
FIG. 1 is a side view, partially sectional, of motorized apparatus for breaking an optical fiber.
Figure 4:
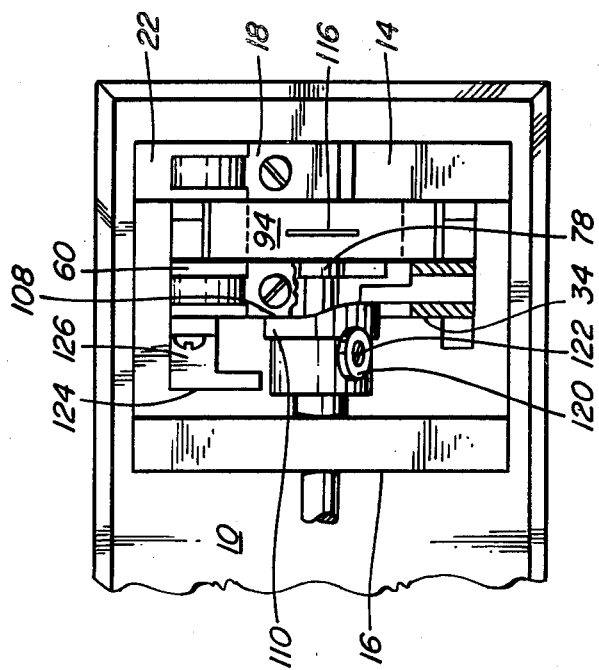
FIG. 4 is a partially cutaway plan view.
Figure 3:
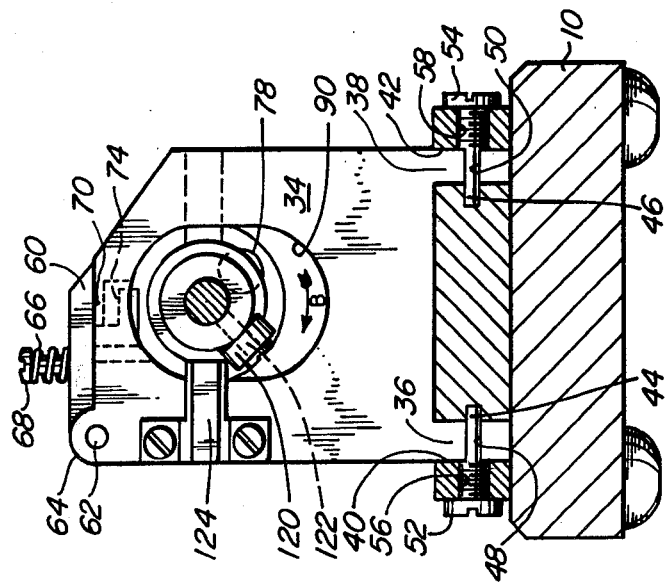
FIG. 3 is a section view taken on the line 3—3 of FIG. 1.

In FIG. 1, a drive motor 230 is shown mounted on an upright support plate 232 with its drive shaft 234 parallel to the actuator shaft 82. The motor drive shaft 234 is coupled to the actuator shaft 82 by reduction gearing, comprising a pinion 236 secured to the motor drive shaft 234 engaging a gearwheel 238 secured to a portion of the actuator shaft 82 projecting beyond support 16.

The support plate 232 supports a starter switch 240 which serves to connect a supply (not shown) to energize the motor at the start of the operating sequence. Between the gear pinion 238 and the support 16, the shaft 82 carries a radial cam 242 which serves to operate a switch 244, mounted on the support plate 232 below the shaft 82, and de-energize the motor. The switches 240 and 244 are so interconnected that, once energized, the motor will continue to drive the actuator shaft 82 until a complete revolution has been made and the entire operating sequence completed.

Figure 12:
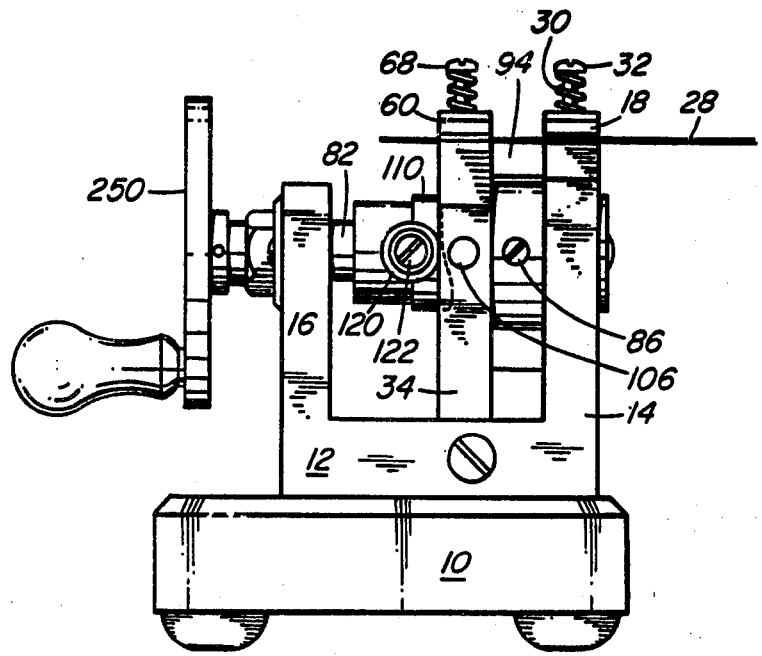
FIG. 12 is a side view of manually operable apparatus for breaking an optical fiber.

FIG. 12 shows a manually operated embodiment of the invention, differing from the embodiment of FIG. 1 only in that the drive for the actuator 82 is by means of a cranked handle or handwheel 250 which replaces the drive motor and reduction gearing. The cranked wheel 250 is connected directly to that end of the actuator shaft 82 which protrudes beyond the limb 16 of the U-shaped support member 12. Other parts of the apparatus are the same as the motorized embodiment, and are designated by the same reference numerals.

Preferably the handwheel 250 is coupled to the shaft 82 by a ratchet, one-way clutch or other suitable means for ensuring rotation of the rotary actuator in one direction only.

What is claimed is:

1. A method of breaking an optical fiber, including the steps of scoring the fiber transversely to its length to produce a score, and tensioning the fiber longitudinally to cause a crack to propagate from the score completely across the fiber, wherein a level of tension sufficient to cause the crack to propagate across the fiber is applied to the fiber after, but not during, the scoring step, and during the scoring step the fiber is subjected to a controlled tension insufficient to sever the fiber when scored, the first-and second-mentioned tension being produced substantially without bending of the fiber by stretching it between spaced locating means and urging said locating means apart.

2. Apparatus for breaking an optical fiber, comprising two spaced members each having locating means operable to locate against longitudinal movement relative to that member a portion of the optical fiber to extend between the members, the spaced members being relatively movable to increase the spacing between the locating means in the direction of the longitudinal axis of the fiber, means for scoring the fiber transversely to its length between the spaced locating means to produce a score, and means for urging the spaced locating means apart to apply to the fiber, after, but not during, the scoring step, tension sufficient to cause the crack to propagate completely across the fiber, and during the scoring step, to produce in the fiber a tension of a level insufficient to cause the fiber to sever on scoring.

3. Apparatus as defined in claim 2, comprising a common actuator means for controlling operation of the urging means and the scoring means.

4. Apparatus as defined in claim 3, wherein the actuator is rotatable about an axis extending generally parallel to the said direction of movement of the fiber locating means, and the scoring means includes a scoring tool projecting radially from the actuator so as to traverse and score the fiber during rotation of the actuator.

5. Apparatus as defined in claim 4, wherein the actuator is supported by a bearing supported by one of the spaced members, the bearing being adjustable to control axial play between the actuator and the said one of the spaced members.

6. Apparatus as defined in claim 5, wherein the said bearing comprises a ball bearing having an outer race and an inner race, one of the races abuts at one side against the actuator and the other face abuts at the opposite side of the bearing a part adapted to engage said one of the spaced members and movable axially relative thereto.

7. Apparatus as defined in claim 6, wherein the said part is externally screw-threaded to engage a correspondingly screw-threaded interior of a hole in said spaced member.

8. Apparatus as defined in claim 5, wherein the actuator is supported also by a second bearing supported by a support member spaced from said one of the spaced members in the direction of the actuator axis, the second bearing being adjustable oppositely to the first bearing to control axial play between the actuator and said support member.

9. Apparatus as defined in claim 8, wherein said second bearing comprises a ball bearing having an inner race and an outer race, one of the races abuts at one side of the bearing against the actuator and the other race abuts at the opposite side of the bearing against a further part adapted to engage said support member and movable axially relative thereto.

10. Apparatus as defined in claim 9, wherein said further part is externally screw-threaded to engage a corresponding screw-threaded interior of a hole in said support member.

11. Apparatus as defined in claim 3, wherein the actuator comprises a set of cam parts spaced angularly relative to each other and to the scoring tool such that rotation of the actuator causes in succession,
 (i) a first cam means to actuate at least one of the locating means to a state wherein a fiber to be broken is positively located at least longitudinally relative to the apparatus;
 (ii) a second cam means to limit movement of one of the spaced members, by the urging means, away from the other of said members during operation of the locating means to locate the fiber and thereafter to release the member so that the fiber is tensioned by the spring means urging the members apart;
 (iii) the scoring tool to sweep past and score the fiber between the locating means;
 (iv) a third cam means to urge the spaced members apart so as to sever the scored fiber;
 (v) the first cam means to actuate said one of the locating means to release the broken fiber piece located thereby.

12. Apparatus as defined in claim 11, wherein the cam means and scoring tool are disposed so that a complete sequence of operation takes place during one complete revolution of the actuator.

13. Apparatus as claimed in claim 3, wherein the actuator is rotatable, the apparatus further comprising a handwheel or crank whereby the actuator may be rotated manually.

14. Apparatus as claimed in claim 3, wherein the actuator is rotatable, the apparatus further comprising a drive motor coupled to the actuator for rotation thereof.

15. Apparatus as claimed in claim 14, including switching means for controlling automatic opertion of the actuator through a complete sequence of operations commencing on insertion of the fiber to be broken and terminating on release of the broken fiber.

16. Apparatus as defined in claim 2, wherein the urging means includes spring means arranged to urge the spaced members apart to tension the fiber therebetween to said level insufficient to cause the scored fiber to sever.

17. Apparatus as defined in claim 16, including means for adjusting the force exerted between the spaced members by the spring means.

18. Apparatus as defined in claim 2, wherein one of the locating means comprises a jaw member pivotally attached at one end to the associated one of the spaced members and movable to grip the fiber against an underlying surface of the said member.

19. Apparatus as defined in claim 18, wherein the other of said locating means comprises a jaw member pivotally attached at one end to the associated said member and movable to grip the fiber against an underlying surface of said member.

20. Apparatus as defined in claim 18, wherein the other of said locating means comprises a part adapted to cooperate with a part fixed relative to the fiber in locating the fiber longitudinally relative to the apparatus.

21. Apparatus as defined in claim 20, wherein the locating means part is adapted to engage a screw-threaded optical fiber connector such that the fiber portion to be broken projects from the connector and between the spaced locating means.

22. Apparatus as defined in claim 21, wherein the locating means part includes an externally screw-threaded boss projecting from a side of one of the spaced members facing away from the other of said members, the boss having an internal radially extending seating to abut a corresponding surface of the connector so as to locate the connector axially relative to said member, the boss having a coaxial through hole to receive the portion of the fiber extending from the connector.

23. Apparatus as defined in claim 2, the apparatus further comprising means for limiting flexing of the fiber portion away from the scoring means during scoring.

24. Apparatus as defined in claim 23, further comprising an anvil member between the spaced members and having a support surface disposed to support the fiber portion to be scored, said means for limiting flexing of the fiber portion away from the scoring means during scoring comprising a retaining member having a surface part arranged to overlie said support surface and define therewith a cavity of a depth at least, and substantially, equal to the diameter of the fiber portion to extend therethrough.

25. Apparatus as defined in claim 24, wherein the retaining member is movable between a first, closed, position in which its said surface part overlies said support surface to define said cavity and a second, open, position, in which its said surface part is displaceable away from said support surface to permit insertion of the fiber portion therebetween.

26. Apparatus as defined in claim 25, wherein the retaining member is displaceable between said closed and open positions by the said actuator means.

27. Apparatus as defined in claim 24, 25 or 26, wherein the retaining member is mounted for compliant movement by the fiber away from the scoring tool during scoring.

* * * * *